Patented Feb. 22, 1938

2,109,093

UNITED STATES PATENT OFFICE 2,109,093

PACKAGING SLICED CHEESE

Joseph Rossman and Charley L. Wagner, Rothschild, Wis., assignors to Marathon Paper Mills Company, Rothschild, Wis., a corporation of Wisconsin No Drawing. Application February 15, 1937, Serial No. 125,934

3 Claims. (Cl. 99—178)

This invention relates to packaging sliced cheese.

Heretofore it has been customary to package cheese either in fairly small pieces wrapped in metal foil or in large pieces such as five pound blocks of processed cheese also wrapped in metal foil. It has also been customary to market American Cheddar cheese in the form of longhorns or daisies coated with paraffin wax to prevent mold growth.

The consumer of cheese so packaged ordinarily must slice the cheese for use as in sandwiches, or for serving at the table. Owing to the physical characteristics of many types of cheese, such as Cheddar and Swiss cheese, it is ordinarily difficult to cut the cheese into uniform slices without crumbling or breaking into pieces. In making up sandwiches, housewives find it very inconvenient and cumbersome to cut cheese into suitable slices.

In order to obviate these difficulties we have devised a package of sliced cheese which can be prepared by the cheese manufacturer either before or after curing of the cheese and sold to the consumer in the original wrapper after being so packaged.

Our invention is applicable to all varieties and types of cheese, such as processed or pasteurized cheese, brick cheese, Swiss cheese, Limburger cheese, Cheddar cheese, etc.

In packaging cured or ripened cheese the cheese is cut into uniform slices of any suitable size, weight, thickness and contour. These slices are then evenly assembled face to face by placing them one upon the other. After a suitable number of slices has been assembled so as to form a package of the desired size and weight we enclose the cheese in a self-sustaining pressure sealable sheet made, for example, of a thermoplastic wax-rubber composition as disclosed in Patent 2,054,112, Sept. 15, 1936. According to this patent the sheet is made from a wax-rubber composition having an initial viscosity of at least 8,000 seconds (90 cc. measured on a Scott viscosimeter at 90° C.). The composition may consist of suitable waxes and rubber as disclosed in the aforementioned patent, the rubber content being from 6 to 30% by weight.

A sufficiently large sheet or wrapper of the character described is used so as to completely enclose the assembled slices of cheese. Pressure is then applied to the package in a mold or by any other suitable means so as to bring the wrapper into intimate contact with the external surface of the assembled slices of cheese throughout its area and also to seal the overlapped portions of the sheet in order to seal the seams and prevent access of air to the cheese. If desired, heat may also be applied to the seams by any suitable means to ensure complete sealing of the seams. The heat may be applied during the pressing operation or immediately after it is completed.

We have found that a package of sliced cheese so made will keep for a very long time without any substantial drying out of the cheese due to loss of the original moisture content. We also have found that no mold growth will occur either on the surface of the cheese or between the slices. The slices of cheese can be readily separated from each other after the wrapper is opened and used as desired.

We may print the wrapper with suitable inks such as aniline inks to indicate the brands or trade marks of the manufacturer. If desired, our package may be placed in a suitable paper carton to protect the wrapper from injury during shipment or handling.

Instead of using a wax-rubber film as described we may also wrap the cheese slices with any suitable sheet material coated with a wax-rubber composition as described in Patent 2,054,113, September 15, 1936. When using such coated sheet, care must also be taken to completely enclose the slices so that the coating is in contact with the outer surface of the assembled slices of cheese throughout its entire area in order to prevent access of air thereto so as to prevent loss of moisture and mold growth. The coated sheet material may be cut or folded in any suitable manner so as to accomplish this result when wrapped about the cheese. After being wrapped about the cheese slices suitable pressure is applied so as to cause the coating to adhere to the entire external surface of the assembled slices of cheese and to seal all joints or overlapping seams of the wrapper.

We may also form packages of sliced green or uncured cheese by slicing the green cheese and then wrapping a suitable number of slices assembled face to face in a pressure sealable wrapper made of a wax-rubber composition as disclosed in Patent 2,054,112, September 15, 1936, or in a coated sheet material made according to Patent 2,054,113, September 15, 1936. The same steps in forming the packages are taken as in the case of packaging sliced cured cheese previously described. In order to prevent the slices from coalescing, especially when pressure is applied to the package to seal the wrapper, we may place separator sheets between the slices such as of cellophane, cellulose acetate, waxed paper, wax-rubber film, parchment paper, or ordinary paper. It is not essential, however, to use separators for types of cheese such as American Cheddar as the slices do not readily coalesce during the packaging operation.

After being so packaged the cheese is permitted to cure in the wrapper for a sufficient period of time at a suitable temperature for the particular variety of cheese which is packaged. We have produced sliced packages of Cheddar cheese and cured the cheese for six months at a temperature of 40° F. At the end of this time there was no mold growth on the external surface of the assembled slices or between the slices. The slices were easily separated from each other and had the appearance of freshly sliced cheese.

We claim:

1. A method of packaging sliced cheese comprising the steps of assembling slices of cheese in face to face relation, completely enclosing said assembled slices in a film made of wax-rubber composition having an initial viscosity of 8,000 secs. (Scott viscosimeter at 90° C.), applying pressure to bring the said film into intimate contact throughout the external surface of the said assembled slices and sealing the overlapping portions of the film to exclude access of air to said cheese slices.

2. A method of preserving and ripening sliced green cheese comprising the steps of assembling slices of cheese in face to face relation, completely enclosing said assembled slices in a film made of wax-rubber composition having an initial viscosity of 8,000 secs. (Scott viscosimeter at 90° C.), applying pressure to bring the said film into intimate contact throughout the external surface of the said assembled slices, sealing the overlapping portions of the film to exclude access of air to said cheese slices, and curing the said cheese slices within said film.

3. A method of preserving and ripening green cheese comprising the steps of assembling slices of cheese in face to face relation, completely enclosing said assembled slices in a film made of wax-rubber composition having an initial viscosity of 8,000 secs. (Scott viscosimeter at 90° C.), applying pressure to bring the said film into intimate contact throughout the external surface of the said assembled slices, sealing the overlapping portions of the film by suitable heat and pressure to exclude access of air to said cheese slices, and curing the said cheese slices within said film.

JOSEPH ROSSMAN.
CHARLEY L. WAGNER.